(12) United States Patent
Kim

(10) Patent No.: US 12,038,111 B1
(45) Date of Patent: Jul. 16, 2024

(54) FLEXIBLE HOSE REEL FOR DRAIN PIPE

(71) Applicant: Seung Woo Kim, Suwon-si (KR)

(72) Inventor: Seung Woo Kim, Suwon-si (KR)

(*) Notice: Subject to any disclaimer, the term of this patent is extended or adjusted under 35 U.S.C. 154(b) by 0 days.

(21) Appl. No.: 18/527,447

(22) Filed: Dec. 4, 2023

(30) Foreign Application Priority Data

Jan. 30, 2023 (KR) .................. 10-2023-0011445

(51) Int. Cl.
| | | |
|---|---|---|
| *F16L 3/12* | (2006.01) | |
| *F16L 3/01* | (2006.01) | |
| *E03C 1/302* | (2006.01) | |

(52) U.S. Cl.
CPC .............. *F16L 3/012* (2013.01); *E03C 1/302* (2013.01)

(58) Field of Classification Search
CPC ........... F16L 3/012; E03C 1/302; B08B 9/045
See application file for complete search history.

(56) References Cited

U.S. PATENT DOCUMENTS

| | | | |
|---|---|---|---|
| 6,594,849 B1* | 7/2003 | Nimens ................... | E03F 9/005 |
| | | | 4/255.06 |
| 6,789,564 B1* | 9/2004 | Wu ......................... | F16L 3/012 |
| | | | 137/315.01 |
| 2020/0238345 A1* | 7/2020 | Mavros .................... | B08B 9/045 |

FOREIGN PATENT DOCUMENTS

| | | |
|---|---|---|
| KR | 20-0286381 Y1 | 8/2002 |
| KR | 10-2009-0096115 A | 9/2009 |
| KR | 10-2011-0105275 A | 9/2011 |
| KR | 10-1746407 B1 | 6/2017 |
| KR | 10-1818553 B1 | 2/2018 |
| KR | 10-2129460 B1 | 7/2020 |
| KR | 10-2022-0017772 A | 2/2022 |

* cited by examiner

*Primary Examiner* — P. Macade Nichols
(74) *Attorney, Agent, or Firm* — Revolution IP, PLLC

(57) ABSTRACT

A flexible hose reel for a drain pipe, the flexible hose reel includes: a cylindrical basket comprising a support rod disposed in a central portion thereof, wherein the basket is fixedly fitted into a rectangular frame in which a structure is assembled; and a winding shaft provided on a lower surface of the rotating disk covering an upper portion of the basket, the winding shaft being coupled to the support rod of the basket such that a flexible hose is wound on or unwound from the winding shaft through a withdrawal hole provided in a corner of the basket.

7 Claims, 12 Drawing Sheets

FLEXIBLE HOSE REEL FOR DRAIN PIPE

CROSS REFERENCE TO RELATED APPLICATION

This application claims priority from Korean Patent Application No. 10-2023-0011445, filed on Jan. 30, 2023, which is hereby incorporated by reference for all purposes as if fully set forth herein.

BACKGROUND

Field

The present disclosure relates to a hose reel for winding and unwinding a flexible hose for clearing a blockage in a drain pipe, and to a flexible hose reel for a drain pipe for winding and unwinding a flexible hose by rotating a flexible cord embedded in the flexible hose.

Description

Drain pipes may be clogged over time and depending on the situation of use, and the clogged drain pipes are unclogged by various methods. Recently, a flexible hose having a built-in rotatable flexible cord has been used in order to unclog a clogged drain pipe. That is, a tool mounted on the leading end of the flexible cord may be rotated by rotating the flexible cord while inserting the flexible hose into the drain pipe, thereby unclogging the drain pipe without damaging the drain pipe.

Such a flexible hose is required to bend flexibly with the flexible cord inserted therein and to not be damaged when the flexible cord rotates. A solution was proposed in Korean Patent Application No. 10-2022-0170140 filed on Dec. 7, 2022 by the applicant of the present disclosure. However, in an operation of clearing a drain pipe, it is necessary to insert a flexible hose into the drain pipe while rotating a tool using the flexible cord and to control the revolutions per minute (RPM) of a rotating device providing rotational force to the flexible cord according to the work situation. Accordingly, this operation cannot be performed by a single user (e.g., a mechanic) alone but requires two people to work together, thereby resulting in an increase in labor costs.

In addition, in order to clear the drain pipe, it is desired to store a monitor for viewing the inside and work tools such as and a torque impact wrench separately, and the rotating device is mounted on an existing flexible hose reel and protrudes from the reel. As a result, it is inconvenient to move and dispose the hose reel while the hose reel is oriented in one direction. In particular, when the operation is performed by a single mechanic alone, the operation of pushing the flexible hose into the drain pipe and the operation and the RPM control of the rotating device cannot be performed at a position separated from the hose reel.

RELATED ART DOCUMENT

Patent Document

Patent Document 1: Korean Patent No. 10-1746407 (published on Jun. 13, 2017)
Patent Document 2: Korean Patent No. 10-1818553 (published on Feb. 21, 2018)
Patent Document 3: Korean Patent No. 10-2129460 (published on Jul. 2, 2020)
Patent Document 4: Korean Patent Application Publication No. 10-2022-0017772 (published on Feb. 14, 2022)
Patent Document 5: Korean Utility Model Registration No. 20-0286381 (Registered on Aug. 7, 2002)

BRIEF SUMMARY

In an operation of clearing a drain pipe by rotating a tool fixed to a leading end of a flexible cord inserted into a flexible hose by rotating the flexible cord using a rotating means while pushing the flexible hose into the drain pipe, the hose reel on which the flexible hose is wound or unwound is not held stably, and the operation and the revolutions per minute (RPM) control of a torque impact wrench serving as the rotating means are required during the operation. Thus, the operation cannot be performed by a single user (e.g., a mechanic) alone, and the hose reel cannot be held stably during the operation. Accordingly, the present disclosure is intended to overcome these problems. According to the present disclosure, the hose reel may be moved and used in a stable state, and the rotating means may be operated and RPM-controlled remotely.

According to the present disclosure, a flexible hose reel for a drain pipe includes: a cylindrical basket including a support rod disposed in a central portion thereof, wherein the basket is fixedly fitted into a rectangular frame in which a structure is assembled; and a winding shaft provided on a lower surface of the rotating disk covering an upper portion of the basket, the winding shaft being coupled to the support rod of the basket such that a flexible hose is wound on or unwound from the winding shaft through a withdrawal hole provided in a corner of the basket, wherein a leading end of the flexible hose wound on the winding shaft is fixed to an upper surface of the rotating disk by means of a fastener, with a flexible cord inserted in the flexible hose protruding above the rotating disk, the leading end of the flexible cord is fixed to the shaft at a position above the rotating disk, and the shaft supported on a support is rotatable, the support is coupled to the fastener by means of a one-touch socket, a chuck of a rotating means is coupled so that the rotational force of the rotating means rotates the flexible cord through the shaft, so that when the rotating means is operated during insertion of the flexible hose into a drain pipe, the flexible cord rotates to rotate a tool on the leading end, thereby clearing the drain pipe.

According to the present disclosure, a base member may be disposed above the rotating disk to support and fix a torque impact wrench serving as the rotating means. The rotating means located on the base member may be fixed by means of a fixing member. The height of the base member may be adjusted, and the chuck may be fitted to the shaft for power transmission in a fixed state, irrespective of the type of the torque impact wrench. A C-shaped adjustment member is fitted to an RPM control switch of the torque impact wrench and is tightened to reduce the distance by means of a screw, so that the chuck may be rotated in an RPM controlled state.

According to the present disclosure, one or more second rectangular frames may be fixedly fitted to a lower or upper portions of the rectangular frame. The rectangular frames may be fitted together so that an operation may be stably performed without being interrupted by the base member protruding above the rotating disk. Auxiliary equipment may be received or transported in one or more of the rectangular frames having a hollow interior.

According to the present disclosure, after the torque impact wrench serving as the rotating means is fixed to the base member by means of the fixing member, in a position in which the chuck of the torque impact wrench is fitted to the shaft, the height of the base member may be adjusted to transmit rotational force to the flexible cord. After a battery is detached from the torque impact wrench, a controller may be disposed between the battery and the torque impact wrench. The controller may have a function of transmitting power from the battery to the torque impact wrench and an RPM control function. The controller may work in concert with a remote control worn on a wrist of a user (e.g., a mechanic) to perform on/off and RPM controls. The controller may be provided with a manual switch, and when an RPM is set to a state intended by the mechanic, a controlled rotational force may be transmitted.

The base member according to the present disclosure is fitted around and fixed by full threaded bolts fixed on an upper portion of the rotating disk in a rectangular arrangement. In this state, the height of the base member may be freely adjusted.

According to the present disclosure, due to the controller, the torque impact wrench may be remotely operated by means of a remote control and may also be operated by means of a manual switch. In a case where a clearing operation is performed at a position spaced apart from the hose reel, when the manual switch is used, the mechanic may control the RPM while rotating the flexible cord by means of the manual switch and then push the flexible hose into the drain pipe. In this manner, the mechanic may perform the clearing operation alone. When the remote control is used, the mechanic may perform the operation by remotely controlling the operation and RPM by means of the remote control while pushing the flexible hose into the drain pipe. Accordingly, the mechanic may also perform the clearing operation alone.

According to the present disclosure, in an operation of clearing a drain pipe by rotating the flexible cord while winding and unwinding the flexible hose in which the flexible cord is embedded, the rotational force of the rotating means fixed to the upper portion of the rotating disk is transmitted to the flexible cord while the flexible cord is being wound or unwound by rotating the rotating disk of the hose reel. The flexible cord may be rotated while the flexible hose is being wound or unwound in a simple manner, and at the same time, the operation and RPM of the rotating means may be controlled. Accordingly, the mechanic may perform the clearing operation alone.

According to the present disclosure, the rotating means provided with the controller may be controlled by means of the manual switch. The rotating means may also be remotely controlled using the remote control carried by the mechanic. Accordingly, the mechanic may perform the clearing operation alone.

According to the present disclosure, the basket of the hose reel may be fitted and fixed to the rectangular frame, and the rectangular frame may be enlarged by fitting one or more second rectangular frames thereto. Accordingly, the hose reel operation may be stably performed, and the storage space of the rectangular frames may be enlarged so that additional equipment may be received and transported in the storage space.

DESCRIPTION OF DRAWINGS

The above and other objectives, features, and advantages of the present disclosure will be more clearly understood from the following detailed description, taken in conjunction with the accompanying drawings, in which.

DETAILED DESCRIPTION

Figure 1:
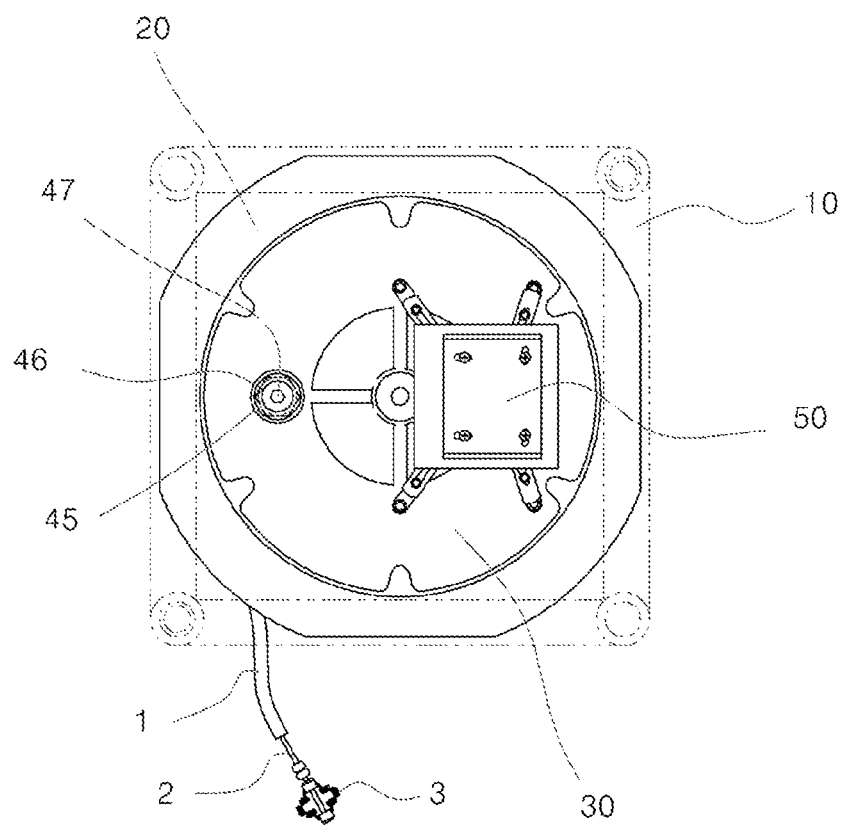
FIG. 1 is a plan view illustrating the inside of a rectangular frame of a hose reel according to the present disclosure.
Figure 2:
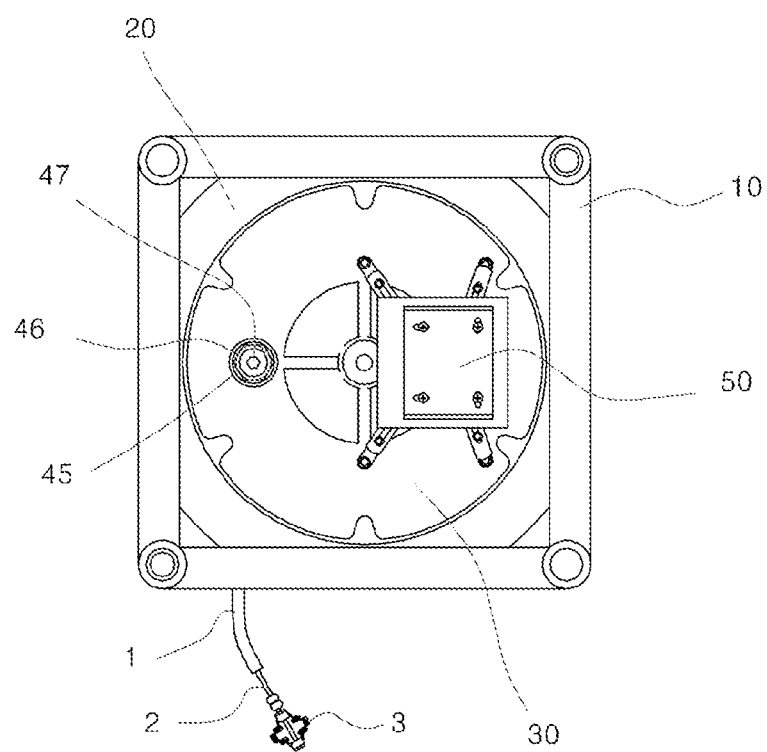
FIG. 2 is a plan view illustrating the hose reel according to the present disclosure.
Figure 3:
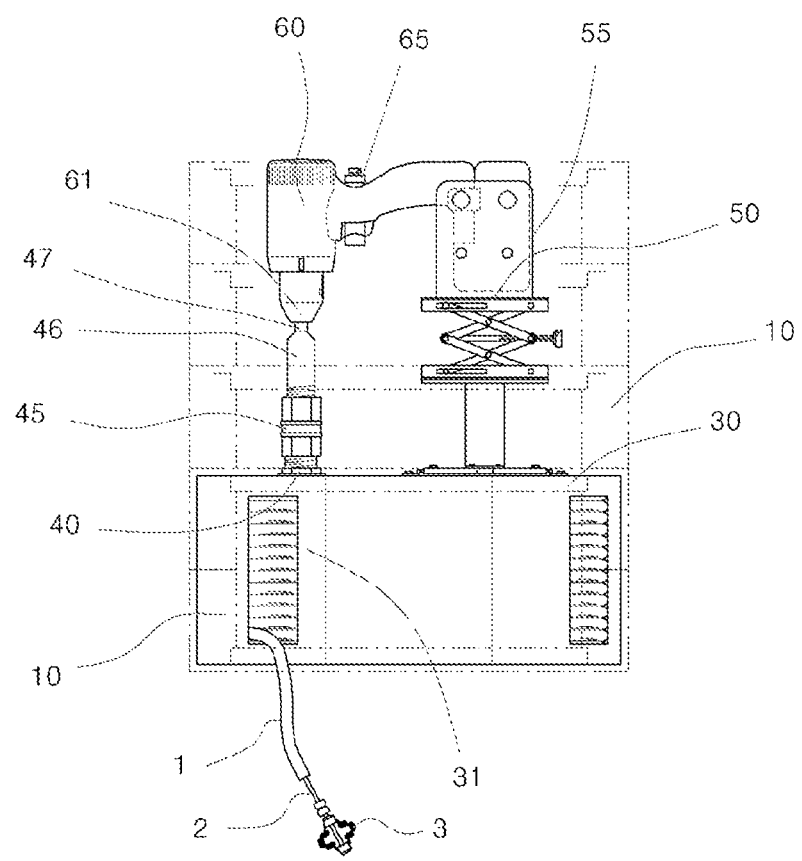
FIG. 3 is a front view illustrating the hose reel according to the present disclosure.
Figure 4:
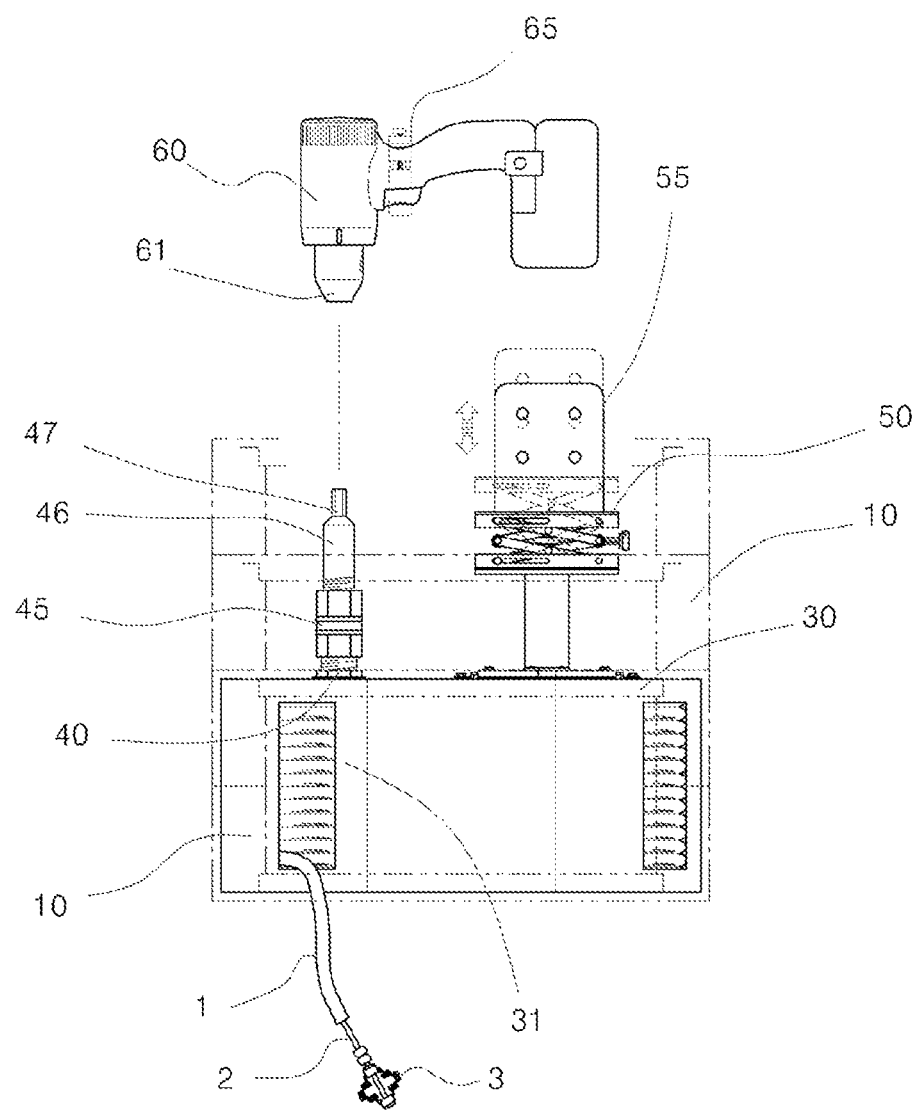
FIG. 4 is a front view illustrating the hose reel according to the present disclosure in which the torque impact wrench is separated.
Figure 5:
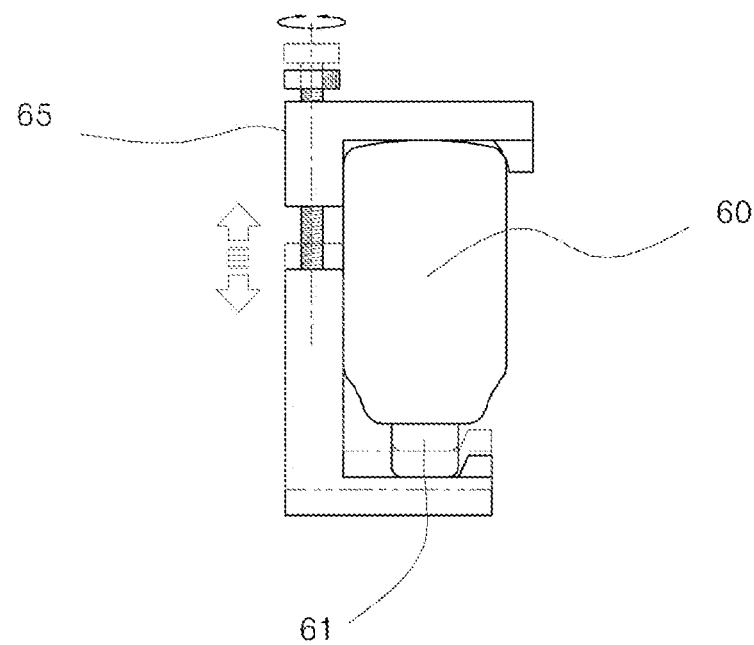
FIG. 5 is a side view illustrating an adjustment member pressing a switch of a torque impact wrench.
Figure 6:
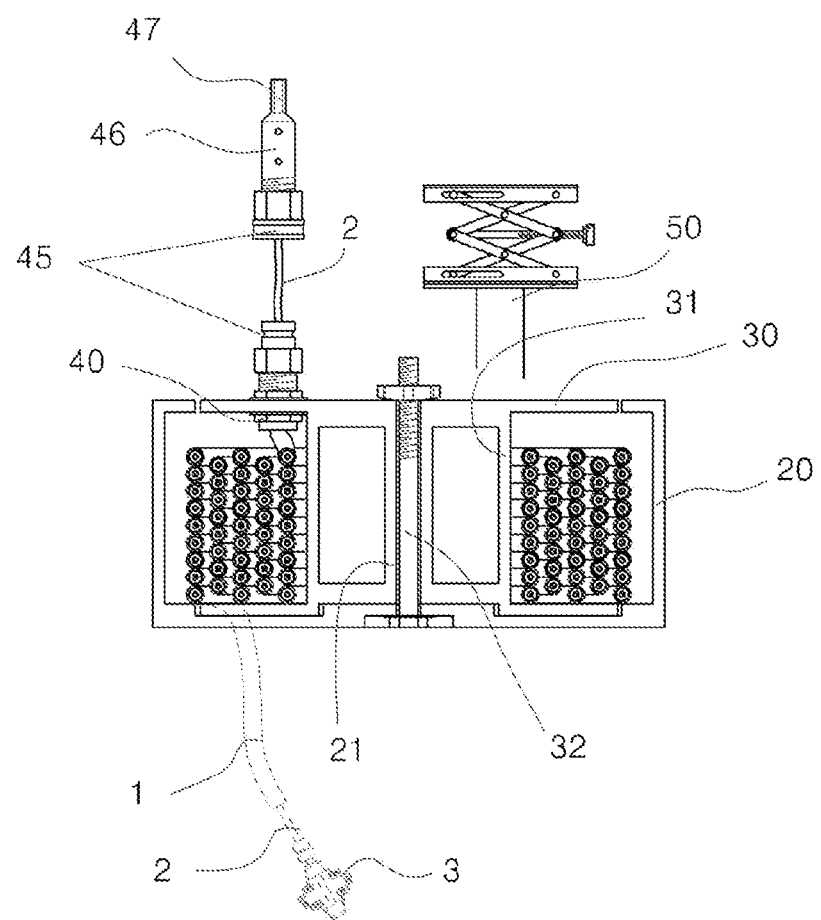
FIG. 6 is a front view illustrating the cross-section of the hose reel according to the present disclosure and the separated state of the one-touch socket.
Figure 7:
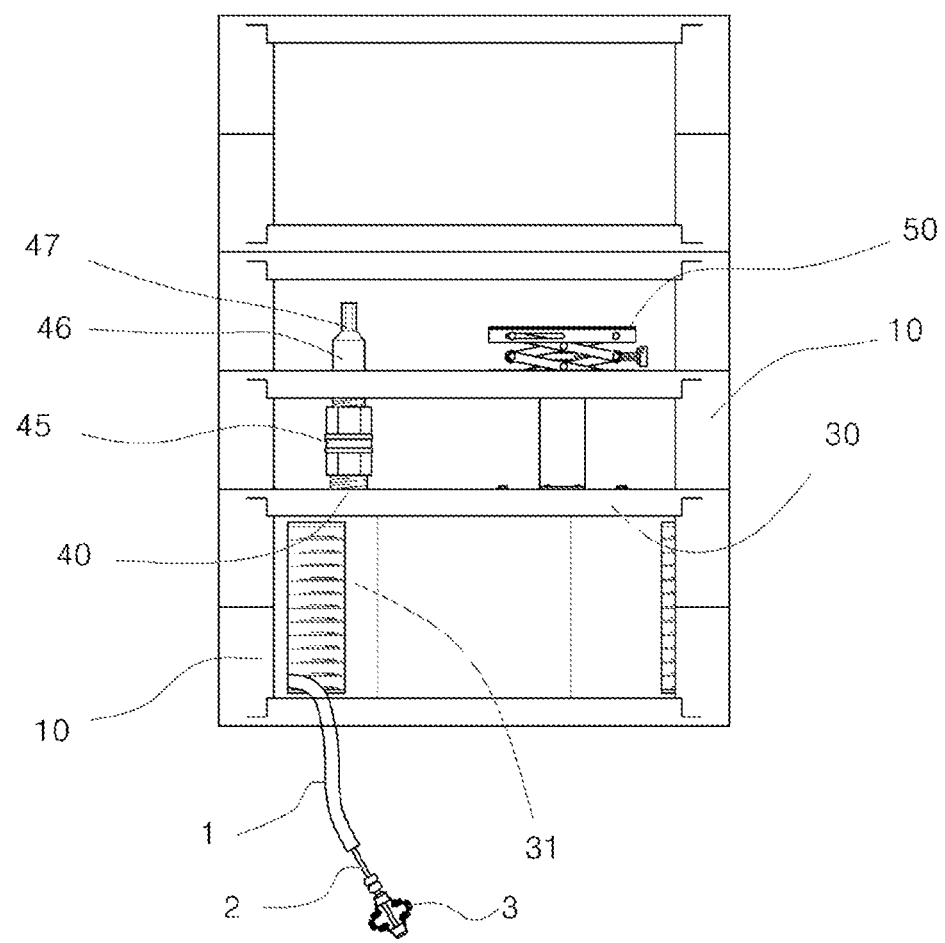
FIG. 7 is a front view illustrating a state in which a rectangular frame is further disposed in the hose reel according to the present disclosure.
Figure 8:
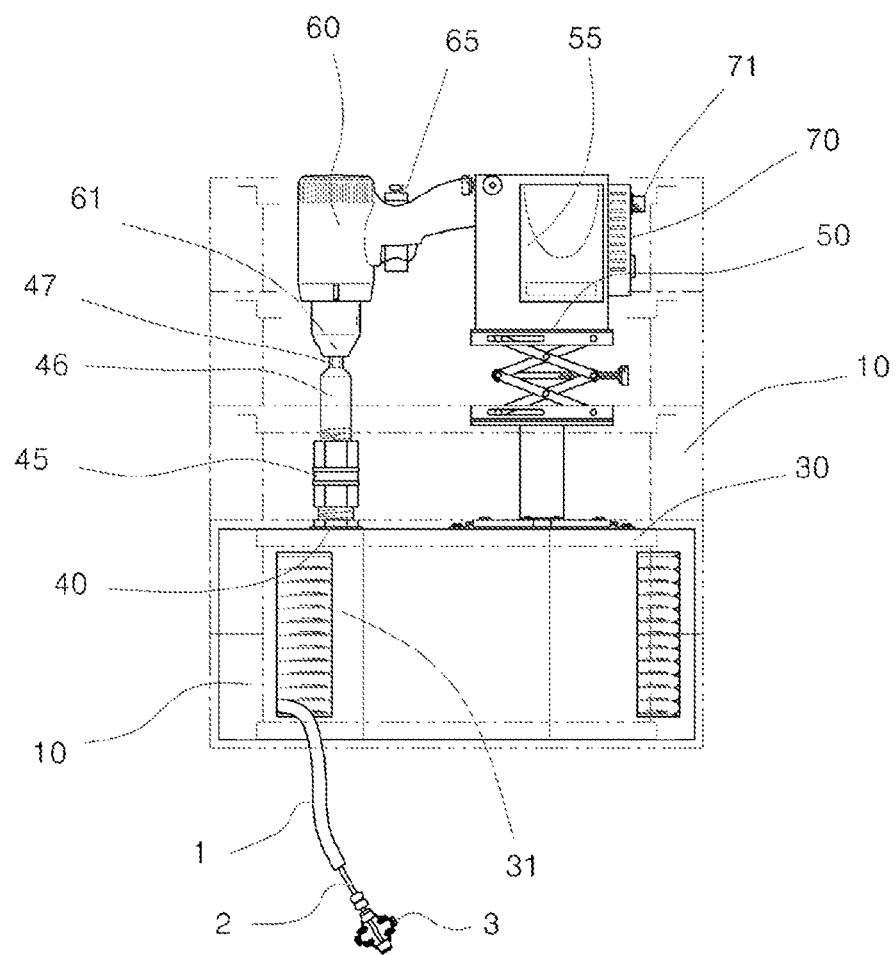
FIG. 8 is a front view illustrating a controller attachment state of the hose reel according to the present disclosure.
Figure 9:
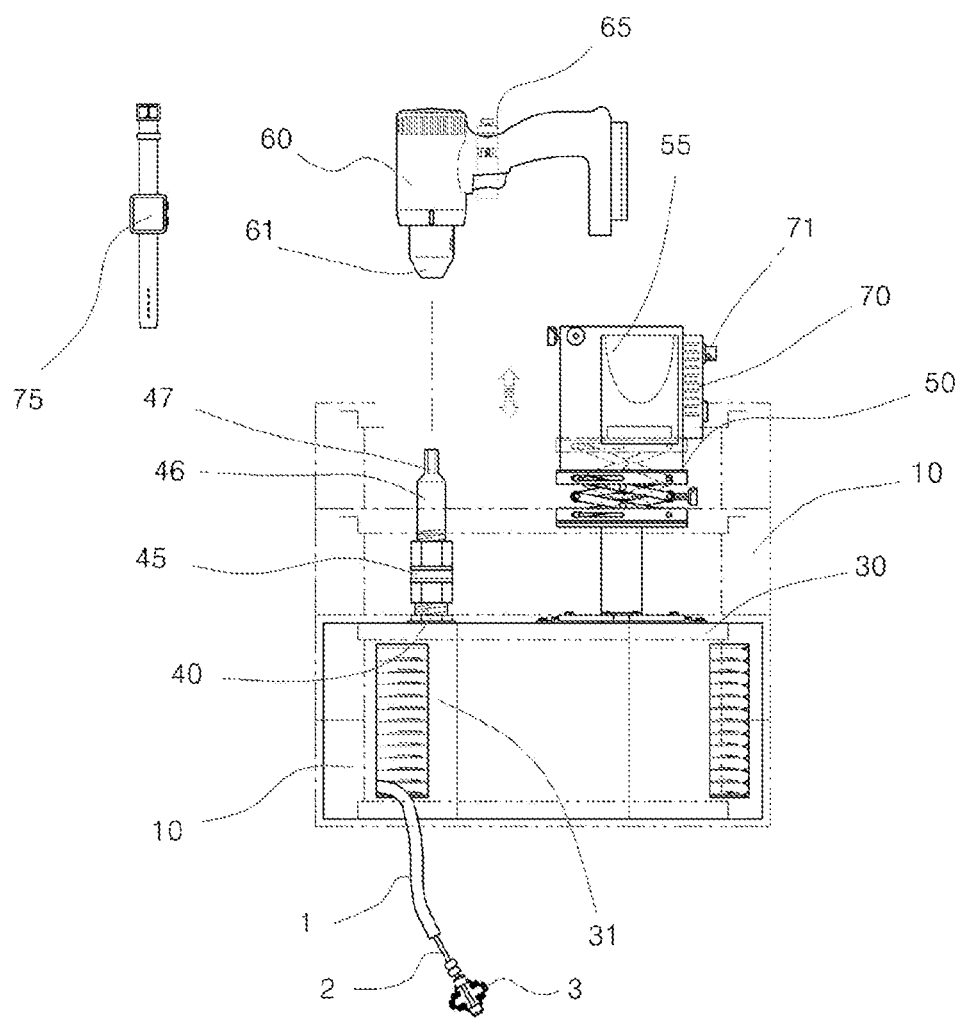
FIG. 9 is a state in which the controller and the remote control are separated in the hose reel according to the present disclosure.
Figure 10:
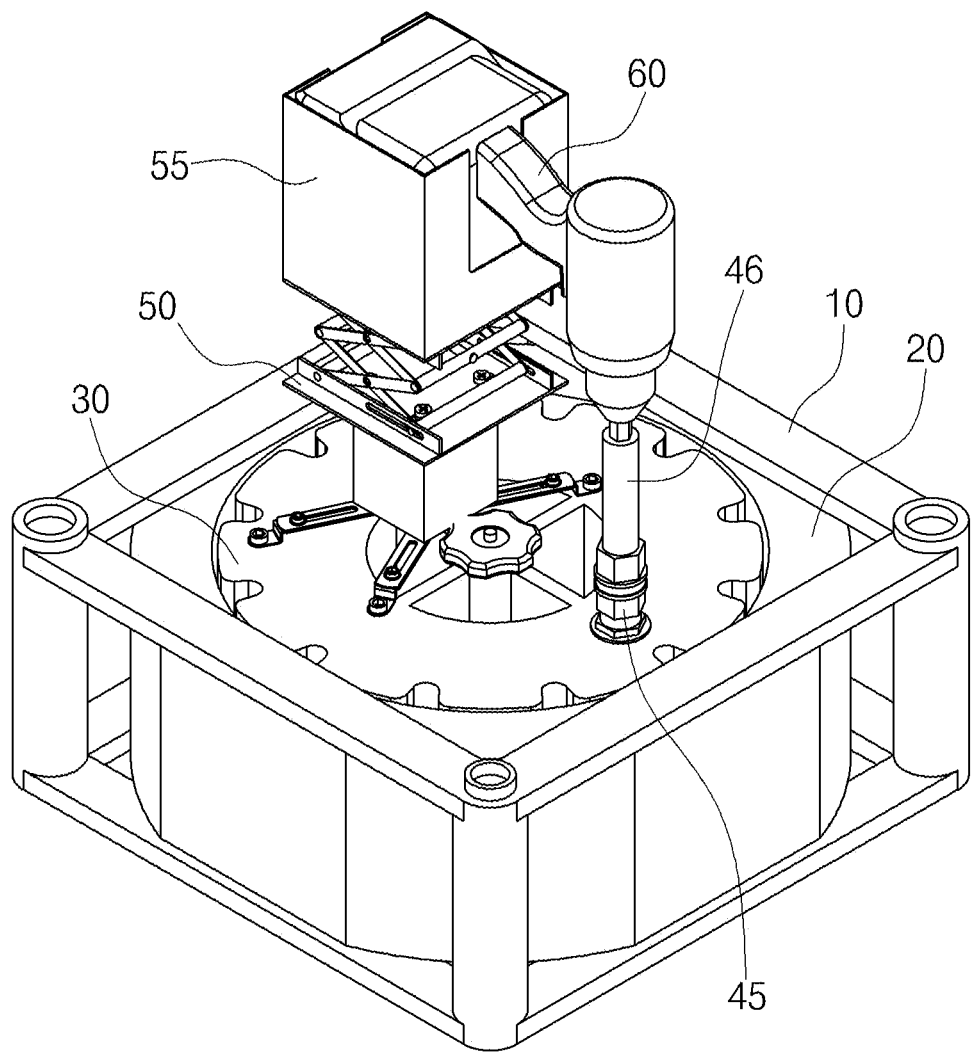
FIG. 10 is an image illustrating an example of the hose reel according to the present disclosure.
Figure 11:
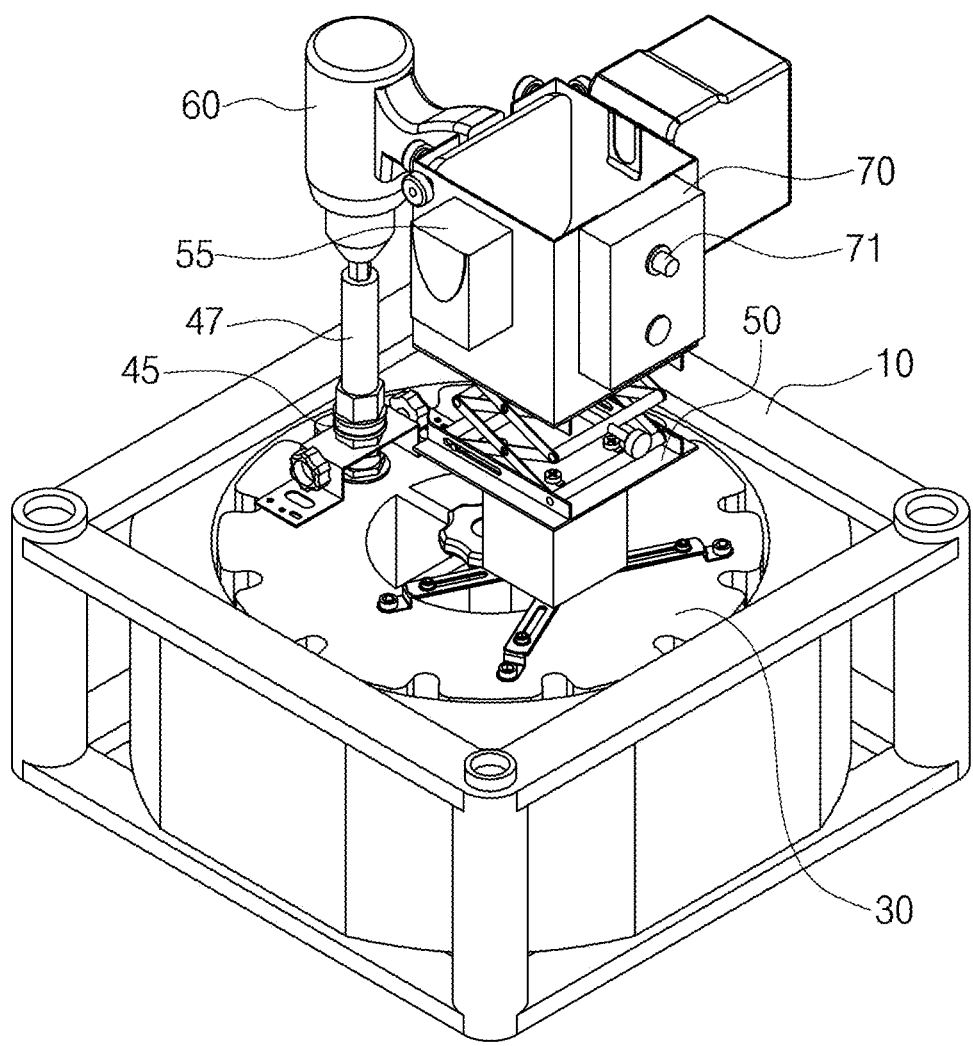
FIG. 11 is an image illustrating another example the hose reel according to the present disclosure.
Figure 12:
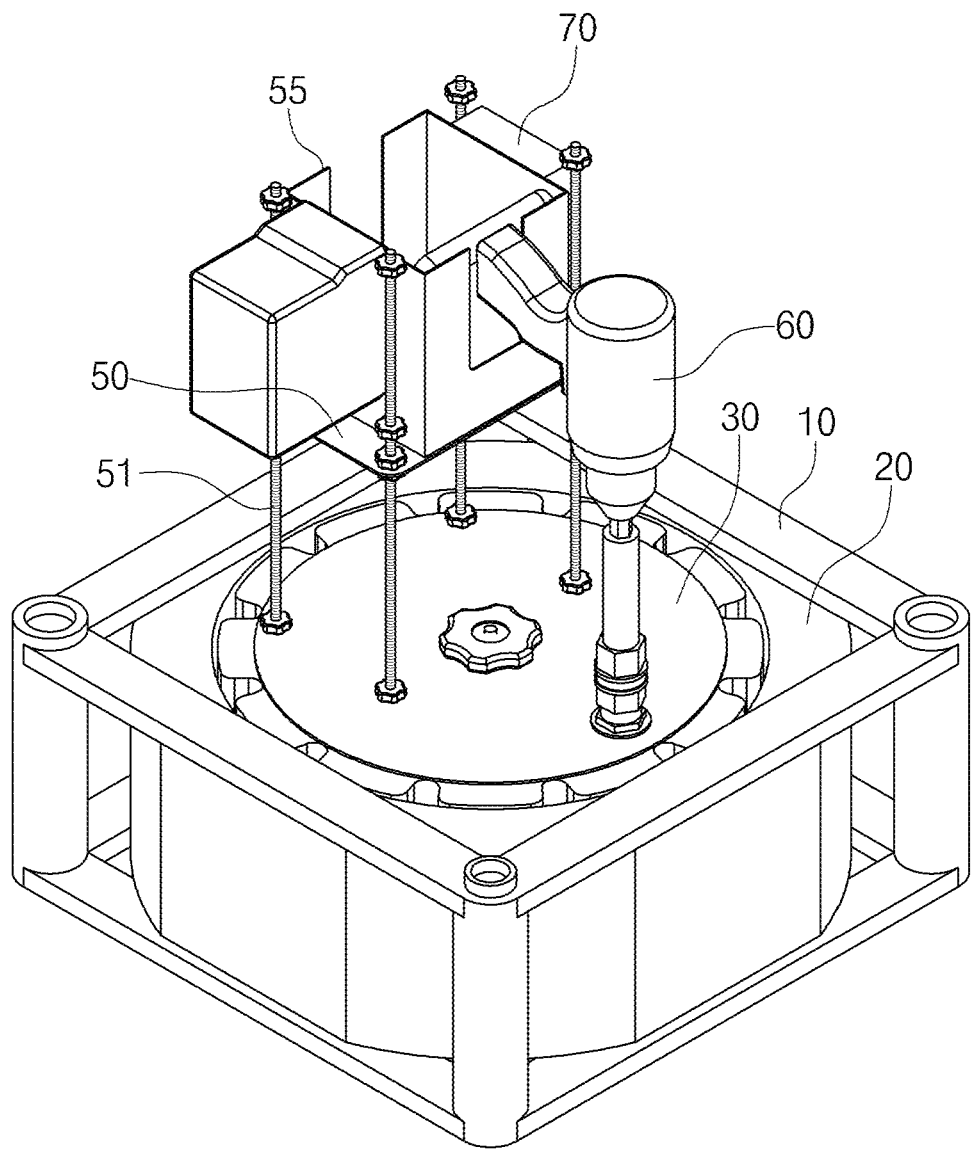
FIG. 12 is an image illustrating an example of the base member of the hose reel according to the present disclosure.

The present disclosure relates to a hose reel for winding or unwinding a flexible hose having a flexible cord embedded therein. Here, the hose reel is configured to unwind the flexible hose wound on a winding shaft of a rotating disk inside a basket of the hose reel and push the same into a drain pipe while rotating the flexible cord using the rotational force of a rotating means disposed on the rotating disk of the hose reel to rotate together with the rotating disk so as to rotate a tool fixed to the flexible cord protruding from the leading end of the flexible hose, thereby unclogging the drain pipe.

The rotating means according to the present disclosure is operated by means of a torque impact switch or a remote control carried by a user (e.g., a mechanic) to control the operation and the RPM of the rotating means. Thus, the operation may be performed by a single mechanic alone, even when not working in close proximity to the hose reel.

In the hose reel according to the present disclosure, a cylindrical basket is fixed within a prefabricated rectangular frame, the flexible hose inserted in a withdrawal hole of the basket is wound on or unwound from the winding shaft of the rotating disk fitted in the basket to rotate, and the flexible cord embedded in the flexible hose protrudes above the rotating disk to receive a rotational force from the rotating means. A height-adjustable base member is disposed on the rotating disk. A torque impact wrench serving as the rotating means is fixed to the base member, and the shaft fixed to the flexible cord is fitted into a chuck of the torque impact wrench. Accordingly, the flexible cord is rotated using the torque impact wrench serving as the rotating means. In this process, the torque impact wrench may be controlled by means of a torque impact switch or a remote control.

The hose reel according to the present disclosure is fixedly inserted into the prefabricated rectangular frame, and the operation of the hose reel is enabled by the rectangular frame. However, due to the base member protruding in one direction, the operation is not stable and may fall during the transportation and operation, and a protruding work member may have a negative effect on the operation. In order to overcome these problems, another rectangular frame may be fitted to the rectangular frame to which the basket is fixedly fitted. Thus, the base member may also be protected using the rectangular frame. Auxiliary equipment necessary for the operation may be received in the other rectangular frame for transportation.

Hereinafter, embodiments of the present disclosure will be described in detail with reference to the accompanying drawings.

According to the present disclosure, a cylindrical basket 20 having a floor may include a support rod 21 erected in the center of the basket 20. The rectangular frame 10 may be formed by assembling known structures, with the basket 20 being disposed therein. The basket 20 disposed within the rectangular frame 10 may be fixed. Separate rectangular frames continuous from both sides of the rectangular frame 10 may be constructed by assembling the known structures. Within such a rectangular frame, the basket for receiving the auxiliary equipment may be fixedly disposed.

The upper end of said basket 20 is closed with a rotating disk 30. The winding shaft 31 projects from the center of the lower surface of the rotating disk 30. The rotating disk 30 rotates in a position in which the said winding shaft 31 is fitted around the support rod 21 of the basket 20. In the central portion of the rotating disk 30, a fixing bolt 32 extends through the basket 20 and is fastened to the rotating disk 30, so that the rotating disk 30 may only rotate in the coupled position.

The flexible hose 1 is wound on the winding shaft 31 of the rotating disk 30. One leading end of the flexible hose 1 wound on the winding shaft 31 is fixed to the rotating disk 30 by means of a fastener 40, and a flexible cord 2 embedded in the flexible hose 1 fixed to the fastener 40 protrudes above the rotating disk 30 through the fastener 40. The flexible cord 2 protruding above the rotating disk 30 is rotatably fitted into a support 46 and is fixed to a shaft 47 protruding above the support 46. The support 46 and the fastener 40 are configured to be coupled to each other by means of a one-touch socket 45. Accordingly, in a state in which the one-touch socket 45 is fastened, when the shaft 47 is rotated, the flexible cord 2 rotates. In a state in which the support 46 and the fastener 40 are separated by means of the one-touch socket 45, oil is injected into the fastener 40 to reduce the resistance of the flexible cord 2 rotating within the flexible hose 1. The flexible cord 2 may be easily replaced as necessary.

Here, the fastener 40 serves to fix the flexible hose 1 to the rotating disk 30. The shaft 47 is coupled to the support 46 in a rotatable manner so as to protrude therefrom. The flexible cord 2 extending through and protruding from the fastener 40 is fixed to the shaft 47. In a position above the rotating disk 30, corresponding ends of the support 46 and the fastener 40 are coupled to the one-touch socket 45. Accordingly, the support 46 and the fastener 40 may be easily coupled to or decoupled from each other by means of the one-touch socket 45.

The flexible hose 1 wound on the winding shaft 31 rotating together with the rotating disk 30 is withdrawn through one of withdrawal holes formed in corners of the rectangular frame 10. A tool 3 is fixed to the leading end of the flexible cord 2 embedded in the flexible hose 1. Accordingly, when the flexible cord 2 is rotated by means of the shaft 47, the tool 3 is rotated. In this state, when the flexible hose 1 is pushed into the drain pipe, the rotating tool 3 may clear a clog in the drain pipe.

The structure for providing the flexible hose 1 with flexibility and preventing the flexible hose 1 from being damaged using the flexible cord 2 during rotation of the flexible cord 2 embedded in the flexible hose 1 according to the present disclosure is disclosed in Korean Patent Application No. 10-2022-0170140 filed by the applicant.

In the hose reel according to the present disclosure, the flexible hose 1 is wound or unwound by rotating the rotating disk 30. After the tool 3 fixed to the flexible cord 2 embedded in the flexible hose 1 is pushed into the drain pipe, the shaft 47 protruding above the rotating disk 30 is rotated by means of the torque impact wrench 60 so as to rotate the tool 3, thereby clearing the drain pipe. In this process, the flexible hose 1 is pushed in or withdrawn.

According to the present disclosure, a base member 50 is fixed to the upper portion of the rotating disk 30, and the height of the base member 50 is adjusted. The torque impact wrench 60 is located on the upper portion of the base member 50 and is fixed by means of a fixing member 55 such that the chuck 61 of the torque impact wrench 60 is fixed in a downward orientation. Thus, torque impact wrench 60 is fixed, with the chuck 61 being fitted to the shaft 47. Here, the torque impact wrench 60 is fixed, with the chuck 61 of the torque impact wrench 60 being fitted to the shaft 47, by adjusting the height of the base member 50.

Here, the base member 50 may be fixed by disposing legs in three or four directions in order to firmly fix the torque impact wrench 60 rotating. the chuck 61 The height of the base member 50 may be adjusted by means of a variable method such as screw turning method or a link adjustment method. The base member 50 may be easily realized by a person having ordinary knowledge in the art, even with structural differences, as long as the base member 50 supports the torque impact wrench 60, which is the basic function of the base member 50, and is height adjustable.

In addition, as illustrated in the figures, after full threaded bolts 51 are fixed on the upper portion of the rotating disk 30 in a rectangular arrangement, the base member 50 according to the present disclosure may be fixed by means of the full threaded bolts 51.

According to the present disclosure, an operation switch of the torque impact wrench 60 may be fixed so as to be pressed by a C-shaped adjustment member 65, in which the degree of pressing of the operation switch may be adjusted according to the degree of tightening an adjustment screw provided on one side of the adjustment member 65.

That is, after the adjustment member 65 is disposed so as to press the operation switch of the torque impact wrench 60, the operation and RPM control of the torque impact wrench 60 may be performed by pressing the operation switch of the torque impact wrench 60 according to the degree of tightening of the adjustment screw on one side of the adjustment member 65. Because pressure by which the adjustment member 65 presses the operation switch of the torque impact wrench 60 may be adjusted, the RPM of the torque impact wrench 60 may be adjusted to an intended state without a separate operation, and the adjusted state of the adjustment member 65 may be maintained unless the adjustment screw is unscrewed.

Accordingly, a mechanic may work alone to clear a drain pipe by pushing the tool 3 into a drain pipe while holding the flexible hose 1 in a state in which the flexible cord 2 is rotated at an intended speed by the RPM control of the torque impact wrench 60 using the adjustment member 65 as described above. Because the tool 3 rotates at the RPM previously adjusted using the adjustment member 65, the mechanic may work alone without separately controlling the RPM of the tool 3 during the operating process. However, this method may make it difficult to control the RPM of the torque impact wrench 60 during the operating process.

In order to overcome this problem, the torque impact may be controlled using a manual switch 71 using a controller 70 or be controlled remotely using the remote control 75. After a battery is removed from the torque impact wrench 60, the controller 70 according to the present disclosure is fastened to a battery mounting portion of the torque impact wrench 60, and the power supply battery is coupled to the controller 70. The controller 70 may have a function of turning on and off power transmitted from the battery to the torque impact wrench 60, a function of simply controlling the RPM of the manual switch 71 disposed on a side thereof, and a function of working in concert with the remote control 75 carried by the mechanic, thereby allowing the mechanic to perform on/off and RPM controls using the remote control 75.

That is, according to the present disclosure, the battery is removed from the torque impact wrench 60, the controller 70 is fastened to the torque impact wrench 60, the battery is connected to the controller 70 to supply power, and then the switch of the torque impact wrench 60 is turned on. In this state, the on/off and RPM controls of the torque impact wrench 60 are performed using the controller 70 by performing on/off control on power application to the torque impact wrench 60 using the controller 70.

The controller 70 is configured to control the operation and RPM of the torque impact wrench 60 using the torque impact switch 71 disposed on a side thereof or control the operation and RPM of the torque impact wrench 60 using the remote control 75. In a case where the torque impact switch 71 is used, the mechanic is close to the hose reel. In a case where the remote control 75 is used, the mechanic works alone while being spaced apart from the hose reel.

According to the present disclosure, when the controller 70 is fastened to the battery mounting portion of the torque impact wrench 60, the battery is connected to the controller 70, and then the switch of the torque impact wrench 60 is set to an on position as described above, the operation and RPM control of the torque impact wrench 60 may be performed by the torque impact switch 71 and the remote control 75. Accordingly, the mechanic may maintain the torque impact wrench 60 in the optimal working environment by selectively using the manual switch 71 or the remote control 75.

The remote control 75 carried by the mechanic may perform the on/off and RPM controls on the torque impact wrench 60 by means of the remote control 75. In a case where the mechanic works alone, the mechanic may operate the torque impact wrench 60 using the remote control 75 while pushing the flexible hose 1 into the drain pipe by holding the leading end of the flexible hose 1, thereby allowing the tool 3 to rotate to clear the drain pipe. Accordingly, the mechanic may work alone by adjusting the RPM of the torque impact wrench 60.

As set forth above, according to the present disclosure, the mechanic may operate the hose reel while controlling the RPM of the torque impact wrench 60 by pushing the tool 3 into the drain pipe at a position spaced apart from the hose reel. Accordingly, the mechanic may operate the hose reel alone in a simple manner, and labor costs may be reduced.

What is claimed is:

1. A flexible hose reel for a drain pipe, the flexible hose reel comprising:
    a cylindrical basket comprising a support rod disposed in a central portion thereof, wherein the basket is fixedly fitted into a rectangular frame in which a structure is assembled; and
    a winding shaft provided on a lower surface of the rotating disk covering an upper portion of the basket, the winding shaft being coupled to the support rod of the basket such that a flexible hose is wound on or unwound from the winding shaft through a withdrawal hole provided in a corner of the basket,
    wherein a leading end of the flexible hose wound on the winding shaft is fixed to an upper surface of the rotating disk by means of a fastener, with a flexible cord inserted in the flexible hose protruding above the rotating disk,
    the leading end of the flexible cord is fixed to the shaft at a position above the rotating disk, and the shaft fitted to a support is rotatable,
    the support is coupled to the fastener by means of a one-touch socket,
    a chuck of a torque impact wrench is coupled to the shaft to transmit rotational force,
    a height-adjustable base member is configured to fix the torque impact wrench at a position above the rotating disk, and
    the torque impact wrench supported on the base member allows a rotational force of the chuck to be transmitted to the shaft in a position in which the torque impact wrench is fixed by means of a fixing member.

2. The flexible hose reel of claim 1, wherein the base member is fixed to an upper portion of the rotating disk,
    the torque impact wrench located on the base member is fixed by means of the fixing member,
    the base member is adjustable in height to transmit force, due to the chuck of the torque impact wrench being fitted to the shaft protruding above the rotating disk.

3. The flexible hose reel of claim 2, wherein full threaded bolts are fixed on an upper portion of the rotating disk in a rectangular arrangement, and the base member is fixed in a height adjustable manner by means of the full threaded bolts.

4. The flexible hose reel of claim 1, wherein the flexible cord is rotatably inserted in the flexible hose configured to be wound on or unwound from the winding shaft of the rotating disk,
    a tool configured to rotate within a drain pipe is disposed at the leading end of the flexible cord withdrawn from the hose reel,
    the flexible hose wound on the winding shaft is fixed to the rotating disk by means of the fastener and is configured such that the flexible cord protrudes above the rotating disk,
    the shaft is fixed to the leading end of the flexible cord and is rotatably fitted to the base, and
    a lower end of the support and an upper end of the fastener are coupled by means of the one-touch socket.

5. The flexible hose reel of claim 1, wherein the rectangular frame with the basket being fitted and fixed therein comprises an assembly of assembly members, and
    the flexible hose reel further comprising one or more second rectangular frames having the same structure as the rectangular frame and disposed continuously on a side of the rectangular frame, wherein auxiliary equipment is received in the one or more second rectangular frames.

6. The flexible hose reel of claim 1, wherein the torque impact wrench is fixed by means of the fixing member in a position in which the torque impact wrench is supported on the base member, a controller is fastened to a battery mounting portion of the torque impact wrench and is supplied with power by a battery, and an operation of the torque impact wrench is controlled by operating a manual switch disposed on a side of the controller or a remote control carried by a user.

7. The flexible hose reel of claim 1, a switch of the torque impact wrench is configured to be pressed with a C-shaped adjustment member, and the operation and revolutions per minute of the torque impact wrench are controlled by pressing the switch of the torque impact wrench by turning an adjustment screw on a side of the adjustment member.

* * * * *